United States Patent
Fryda et al.

(10) Patent No.: US 10,807,887 B2
(45) Date of Patent: Oct. 20, 2020

(54) METHOD FOR ELECTROCHEMICALLY PRODUCING ELECTROLYZED WATER

(71) Applicant: CONDIAS GMBH, Itzehoe (DE)

(72) Inventors: Matthias Fryda, Itzehoe (DE); Thorsten Matthee, Hohenaspe (DE); Barbara Behrendt-Fryda, Itzehoe (DE); Andrea Schmidt, Kremperheide (DE); Linda Heesch, Mehlbek (DE)

(73) Assignee: Condias GmbH, Itzehoe (DE)

( * ) Notice: Subject to any disclaimer, the term of this patent is extended or adjusted under 35 U.S.C. 154(b) by 161 days.

(21) Appl. No.: 15/121,052

(22) PCT Filed: Feb. 24, 2015

(86) PCT No.: PCT/EP2015/000414
§ 371 (c)(1),
(2) Date: Aug. 24, 2016

(87) PCT Pub. No.: WO2015/128076
PCT Pub. Date: Sep. 3, 2015

(65) Prior Publication Data
US 2016/0362310 A1 Dec. 15, 2016

(30) Foreign Application Priority Data
Feb. 25, 2014 (DE) .................. 10 2014 203 374

(51) Int. Cl.
*C02F 1/461* (2006.01)
*C02F 1/467* (2006.01)

(52) U.S. Cl.
CPC ........ *C02F 1/4618* (2013.01); *C02F 1/46109* (2013.01); *C02F 1/4672* (2013.01);
(Continued)

(58) Field of Classification Search
CPC .. C02F 1/4618; C02F 1/46109; C02F 1/4672; C02F 2301/024; C02F 200/4619; C02F 200/46147
See application file for complete search history.

(56) References Cited

U.S. PATENT DOCUMENTS 6,565,736 B2  5/2003  Park et al.
8,337,958 B2 *  12/2012  Cao ................... C25C 7/02
                                              204/192.38
(Continued)

FOREIGN PATENT DOCUMENTS

DE    29916125 U1   12/1999
DE    69908476 T2   12/2003
(Continued)

*Primary Examiner* — Louis J Rufo
(74) *Attorney, Agent, or Firm* — W&C IP (57) ABSTRACT

The invention relates to a method for electrochemically producing electrolyzed water in an electrode arrangement (10) which has an anode chamber and a cathode chamber that are separated by an ion-selective membrane (30). The anode chamber is delimited on at least one side by at least one anode (2), and the cathode chamber is delimited on at least one side by at least one cathode (2). In the method: a) water, in particular distilled water or ultra purified water, in which an electrolyte is located, is conducted through the anode chamber, b) water, in particular distilled water or ultra purified water, is conducted through the cathode chamber, c) the water, in particular the distilled water or the ultra-purified water, is mixed and in particular set into a turbulent flow in the anode chamber and/or cathode chamber, and d) an electric voltage is applied to the anode and the cathode such that electrolyzed water is produced in the cathode chamber.

19 Claims, 3 Drawing Sheets

(52) U.S. Cl.
    CPC ......... *C02F 2001/4619* (2013.01); *C02F 2001/46147* (2013.01); *C02F 2201/4611* (2013.01); *C02F 2201/46115* (2013.01); *C02F 2301/024* (2013.01)

(56) References Cited

U.S. PATENT DOCUMENTS

| | | | |
|---|---|---|---|
| 2004/0226817 A1* | 11/2004 | Hosonuma | C23C 18/1216 204/280 |
| 2007/0017801 A1* | 1/2007 | Fukui | C02F 1/4618 204/230.2 |
| 2007/0029190 A1* | 2/2007 | Hosonuma | B82Y 30/00 204/280 |
| 2009/0301865 A1* | 12/2009 | Yoshida | C02F 1/46109 204/242 |
| 2010/0006450 A1* | 1/2010 | Whitehead | C02F 1/46109 205/742 |
| 2010/0320082 A1* | 12/2010 | Kato | C25B 1/13 204/266 |
| 2011/0259760 A1 | 10/2011 | Swartz et al. | |
| 2011/0308938 A1 | 12/2011 | Gilmore et al. | |
| 2015/0060267 A1* | 3/2015 | Mollart | C23C 16/56 204/294 |

FOREIGN PATENT DOCUMENTS

| | | | | |
|---|---|---|---|---|
| DE | 10 2009 039290 A1 | 3/2011 | | |
| DE | 10 2010 010902 A1 | 9/2011 | | |
| DE | 102010010902 A1 * | 9/2011 | ............... | C25B 1/46 |
| EP | 0 994 074 A3 | 4/2000 | | |
| JP | 2004130262 | 4/2004 | | |
| WO | 2013/035762 A1 | 3/2013 | | |

\* cited by examiner

METHOD FOR ELECTROCHEMICALLY PRODUCING ELECTROLYZED WATER

FIELD OF THE INVENTION

The invention relates to a method for the electrochemical production of electrolyzed water in an electrode arrangement, and also to an electrode arrangement for carrying out such a method.

BACKGROUND

Electrolyzed water or alkaline water is currently used in many areas of technology, in particular in semiconductor technology, for cleaning surfaces. Electrode arrangements for producing said electrolyzed water are known, for example, from U.S. Pat. No. 6,565,736 B2 and U.S. Pat. No. 7,074,316 B2. A production method is very clearly described, for example in the article "Electrolyzed Water as an alternative for environmentally—benign semiconductor cleaning chemicals" in the journal clean technology, edition of September 2001, 7(3), pages 215 to 223.

Conventionally, the electrolyzed water or alkaline water is generally produced in electrolysis cells that are separated from one another by ion-selective membranes. The cathode of the arrangement is situated in a first chamber. A further cell contains the anode. Conventionally both electrodes are constructed, for example, as platinum mesh electrodes or platinized titanium electrodes. Between the anode chamber and the cathode chamber there is situated a middle chamber in which no electrode is situated.

The anode chamber and the cathode chamber are charged with ultrapure water or deionized water, whereas the middle chamber contains an electrolyte inflow. The electrolytes are dissolved as ions in water and are moved in the electric field by an electric voltage applied between the electrodes and can pass through the ion-selective membrane respectively provided therefor, in such a manner that the desired electrolyzed water forms in the cathode chamber.

However, this division of the divided electrolysis cell and this method procedure has a number of disadvantages. In particular, the deionized water of the catalyte which is consequently situated in the cathode chamber is separated by the mesh electrode from the actual electrochemical reaction zone. The ions formed at the electrode must therefore be mixed in particular by diffusion, and in particular brought into contact with the respective other ions. In the region of the electrode, however, the flow velocity of the deionized water in the individual chambers is very low, in such a manner that further mixing scarcely takes place. This means that the desired electrolyzed water can only be produced very slowly. A further disadvantage is the usual use of platinum electrodes or platinized titanium electrodes which, despite cathodic use, after the system is shut off, can lead to the liberation of metal ions to a considerable extent. The production process is sensitively affected by semiconductor components which are to be cleaned by the electrolyzed water.

In order to achieve a cell voltage as low as possible, the respective electrodes are arranged in the vicinity of the membrane bordering the respective chamber. In order to achieve good mixing, only mesh electrodes can then be used through which the respective liquid can pass. However, these electrodes have fluid dynamic disadvantages that lead to a less efficient ion yield and an insufficiently low redox potential.

In addition, there is the fact that liquid exiting from the middle chamber and the anode chamber frequently cannot be further used in a logical manner, but frequently must be disposed of in an expensive and complex manner.

SUMMARY

Therefore, the object underlying the invention is to propose a method with which electrolyzed water can be generated more efficiently, and at the same time, the volume of water to be disposed of can be markedly decreased.

The invention achieves the stated object by a method for the electrochemical production of electrolyzed water in an electrode arrangement that has an anode chamber and a cathode chamber which are separated from one another by at least one ion-selective membrane, wherein the anode chamber is bordered on at least one side by at least one anode and the cathode chamber is bordered on at least one side by at least one cathode, wherein in the method:

a) water, in particular distilled water or ultrapure water in which an electrolyte is situated is passed through the anode chamber, b) water, in particular distilled water or ultrapure water, is passed through the cathode chamber, c) the water, in particular the distilled water or the ultrapure water, is mixed in the anode chamber and/or cathode chamber, and in particular is put into a turbulent flow, d) an electrical voltage is applied to anode and cathode in such a manner that electrolyzed water is formed in the cathode chamber.

Such a method has a number of advantages over the method known from the prior art. Firstly, the electrode arrangement no longer need have three separate chambers, but is sufficiently equipped with an anode chamber and a cathode chamber. Since the anode chamber and the cathode chamber on at least one side are bounded by the respective anode or cathode, the water that is passed through the respective chamber is no longer separated from the actual electrochemical reaction zone by the electrode, as is the case with mesh electrodes of the arrangements known from the prior art.

In addition, the water is mixed in at least one of the two chambers, and in particular is put into a turbulent flow. This effect is reinforced by the gas bubbles formed in the electrolysis. On account of the buoyancy of the gas bubbles, they lead to a further mixing, wherein the volumes of the gas bubbles generated is dependent on the current density. Therefore, the greater the current that is selected with which the electrode arrangement is operated, the more gas bubbles are formed and the greater and better is the mixing. This has the consequence that the ions that are formed at the respective electrode can be distributed markedly more rapidly in the water than would be the case via a principally diffusion-controlled process, as is known from the prior art. Owing to this mixing, the sought-after "alkaline water" is formed in the required quality in a considerably shorter time, which already achieves the first energy savings. Also the fact that only a two-component electrode arrangement having only one anode chamber and one cathode chamber is required, leads to further savings of electrical energy. In addition, the amount of wastewater to be disposed of is less, since only the water flowing through the anode chamber needs to be disposed of possibly as wastewater.

The invention in addition achieves the object in question by a method for the electrochemical production of electrolyzed water and ozonized water in an electrode arrangement that has an anode chamber, a cathode chamber and a middle chamber arranged between the anode chamber and the cathode chamber, which are each separated from one another by an ion-selective membrane, wherein the anode chamber is bounded on at least one side by at least one anode and the cathode chamber is bounded on at least one side by at least one cathode, wherein in the method:

a) water, in particular distilled water or ultrapure water, is passed through the anode chamber and through the cathode chamber,
b) water, in particular distilled water or ultrapure water, in which an electrolyte is situated, is passed through the middle chamber,
c) the water, in particular the distilled water or the ultrapure water, is mixed in the anode chamber and/or cathode chamber, in particular is put into a turbulent flow,
d) an electrical voltage is applied to anode and cathode in such a manner that electrolyzed water is formed in the cathode chamber and ozonized water is formed in the anode chamber.

Although the energetic advantage of a two-chamber arrangement is lost by this arrangement, at the same time, in addition to the desired electrolyzed water in the cathode chamber, ozonized water in the anode chamber may be produced that likewise is suitable and can be used as cleaning agent and in particular as disinfectant. The increased efficiency in the production of these two products by the mixing and in particular being put into turbulent flow of the respective liquid in the anode chamber and/or the cathode chamber is further achieved. In addition, there is also the fact here that the water in the anode chamber and in the cathode chamber is no longer separated by the respective electrode from the electrochemical reaction zone, since in this configuration also, the mesh electrodes known from the prior art need not be used.

In an exemplary configuration of the method, demineralizing water is passed directly through the anode chamber of the electrolysis cell. At the anode, in this case by the electrolysis, from about a current of approximately 2 amperes which corresponds to a current density of approximately 14 mA per $cm^2$, ozone is detectably generated and dissolved in the water. In this case the ozone production increases linearly with increasing current. The amount of ozone generated per selected unit of time is in this case virtually independent of the size of the volumetric flow rate of the liquid that is passed through the chambers. At all events, at different volumetric flow rates, different hydrodynamic states occur, as a result of which more or less of the gaseous ozone can be dissolved in the water. A higher volumetric flow rate leads to greater turbulences within the respective chamber and thereby to smaller gas bubbles of the ozone generated at the anode surface. Owing to the smaller gas bubbles, the contact area or boundary area between the gaseous ozone and the surrounding water is increased, in such a manner that more ozone can be dissolved in the water.

In order to dissolve as much ozone as possible in a preset amount of water, it is consequently not necessarily advisable to reduce the flow velocity of the water and thus ensure that the water remains as long as possible in contact with the anode surface. Under certain circumstances, it is more rational to select the flow velocity to be greater, and so a greater fraction of ozone can be dissolved in the water. Should, in this manner, a sufficient ozone concentration not be able to be achieved in the water, the water can again be passed through the anode chamber, and thus the ozone concentration increased. In this case, however, it must be noted that ozone in water undergoes a natural decomposition to oxygen.

Regardless of the actual configuration of the electrode arrangement, it has proved to be advantageous when the anode and/or the cathode have an electrode surface that has a structure in such a manner that a distance between the respective electrode surface and an opposite side of the respective chamber repeatedly increases and decreases in at least one direction, wherein the structure forms at least 30%, preferably at least 50%, further preferably at least 60%, further preferably at least 75%, and particularly preferably at least 90% of the electrode surface, wherein the water in the anode chamber and/or the cathode chamber is mixed by the structure of the electrode surface and in particular is put into a turbulent flow. The structure in this case preferably has a depth of at least 0.2 mm. This means that the distance between the electrode surface and the opposite side of the chamber increases and decreases in at least one direction repeatedly by at least 0.2 mm.

The electrode surface is taken to mean here the actual surface of the electrode, that is to say the surface which comes into contact with a liquid during the specified use of the electrode arrangement. If the structure is, for example, at least one rectangular groove introduced into the electrode, not only the base or the bottom of this groove, but also the side walls of the groove are included as part of the electrode surface, since they come into contact with liquid during the specified use of the electrode arrangement. The electrode surface is therefore increased by the structure compared with a planar surface. A structure in this case is taken to mean, in particular, everything which increases the electrode surface area in comparison with a planar surface having the same outer dimensions, in particular elevations and/or depressions. The planar surface having the same outer dimensions as the electrode is hereinafter denoted the basal area of the electrode and therefore by definition has no type of structures.

By this configuration of the electrode surfaces of the anode and/or the cathode, a sufficient mixing of the liquid in the respective chamber is already achieved without separate components, such as, for example, static turbulators, being necessary. As a result, firstly the number of necessary structural elements is decreased, and secondly, the electrode surface area available for electrolysis is increased, in such a manner that hereby an increase in efficiency is achieved. A sufficient mixing and turbulent flow is thereby achieved, which is necessary in order that mass transport phenomena, such as, for example, diffusion, are not considered as limiting the electrochemical efficiency. The anode and the cathode in this case can be formed with identical or else different structures. They can in addition be produced from the same or different materials.

The structure in the electrode surface is in this case constructed in such a manner that the distance between the electrode surface and the second side that borders the continuous-flow chamber on the side opposite to the electrode, repeatedly increases and decreases along at least one direction. This at least one direction can be, for example, the flow-through direction. The structure advantageously comprises a multiplicity of recesses which can have virtually any desired shapes. If a plurality of said recesses which can be constructed so as to be identical or different to one another are arranged along the at least one direction in succession, this leads to the desired effect that the distance between the electrode surface and the second side of the continuous-flow chamber repeatedly increases and decreases.

It has proved to be advantageous when said distance repeatedly increases and decreases in more than only this one direction. In a preferred embodiment, the electrode surface is provided with a structure which ensures that the distance between the electrode surface and the opposite second side of the continuous-flow chamber repeatedly increases and decreases in each direction which extends in parallel to the electrode surface. In this case, it is also conceivable that there are regions in which the distance becomes zero, in such a manner that the electrode surface contacts the opposite side wall. In this case, it is clearly important that the electrical insulation between the two electrodes of the electrode arrangement is still maintained. Regions in which the spacing between the electrode surface and the opposite second side becomes zero can be arranged, for example, in a linear manner, or be distributed in an island-manner over the continuous-flow chamber. The actually selected shape of the structure and also of the structural elements forming the structure depends in this case on the desired reactions, the selected liquids and also on the required flow volumes and the electrical voltages to be applied and on the electric current.

The structure, as already described, can consist of a multiplicity of structural elements, in the context of this application, therefore is taken to mean the part of the electrode surface in which the distance between the electrode surface and the opposite side of the continuous-flow chamber varies, that is to say therefore repeatedly increases and decreases along at least one direction.

In the electrode arrangements described here, the anode chamber and/or the cathode chamber is bordered on at least one side by the respective electrode. This clearly means, necessarily, that in particular in these chambers the flow-through direction of the liquid in contrast to, for example, in the case of the perforated electrodes known from the prior art, runs in parallel to the electrode surface.

The structure in the anode surface and/or the cathode surface advantageously has a multiplicity of recesses or grooves or rills, which can have, for example, a varying width and/or depth. These can be channels having a defined width and depth, wherein, here also, width and/or depth can vary in the course of the respective channels. Also channels having a constant width and depth are possible. The channels can be arranged in parallel to one another, crossing one another at an angle, which is preferably 90°, or be arranged, for example, in a wave shape or curved. The distances between the individual recesses, rills, grooves or channels can be selected to be equidistant over the entire electrode surface, or varying. Thus, it can be advantageous when, for example, in some regions of the electrode surface of the anode and/or the cathode, more elements are present that form the structure than is the case in other regions of the respective electrode surface. In this manner, in a targeted manner regions having turbulent flow and good mixing of the liquid flowing through the respective chambers are achieved, which alternate with regions of calm and laminar flow. In a preferred embodiment, the structure has a multiplicity of recesses that can in particular overlap one another and for example be formed in the shape of sphere surface segments. These are consequently recesses in which the electrode surface of the anode and/or of the cathode is curved in a sphere surface segment manner, preferably inwards, that is to say away from the wall of the respective chamber opposite the electrode. If a plurality of said recesses overlap one another, this means that a respective borderline surrounding a respective recess is not circular. In addition, such a line is not in a constant plane. Obviously, recesses are also conceivable which are not constructed in a sphere surface segment shape, but, for example, have polygonal, paraboloid or irregular shapes. Here also, regions of greater recess density in which consequently more recesses are available in a defined area section, can alternate with regions of lower recess density, in which the number of recesses per unit area is smaller. Also by this means, the flows in the interior of the respective anode chamber and/or the cathode chamber can be influenced and set in a targeted manner to the desired parameters.

In a preferred embodiment of the method, a differing volume of water is passed through the differing chambers of the electrode arrangement. In particular because the catholyte flux proceeds directly on the electrochemically active electrode surfaces, and, advantageously, both in the anode chamber and in the cathode chamber sufficient and good mixing and turbulent flow of the liquid occurs, it is possible to match the flow volumes in the respective chambers to one another. It is possible, for example, to produce in the anode chamber, in a relatively small volume of the water admixed with electrolyte the number and density of ions and reaction products, which therefore must be present in the cathode chamber, which are necessary for the production of electrolyzed water in the desired quality. It follows therefrom that a possibly markedly smaller volume of liquid per unit time need be passed through the anode chamber than is the case in the cathode chamber in which the desired electrolyzed water is produced.

It has proved to be advantageous in this case when through the cathode chamber, or through the anode chamber, respectively, more, in particular more than twice as much, preferably more than five times as much, particularly preferably more than ten times as much, water is passed through the anode chamber or the cathode chamber, respectively. Also when a method according to a further exemplary embodiment of the present invention is used, in such a manner that electrolyzed water is formed in the cathode chamber and ozonized water in the anode chamber, it is advantageous to pass a differing amount of liquid through the differing chambers of the electrode arrangement. Since, in this case, the anode chamber and the cathode chamber are used for production of a desired end product, it is advantageous when a higher flow volume is established not only in the anode chamber but also in the cathode chamber than is the case, for example, in the middle chamber, into which in this case ultrapure water admixed with an electrolyte is introduced. In this manner it is possible, regardless of the electrode arrangement and method used to diminish drastically the wastewater volume which must be disposed of possibly in an expensive and complex manner, as a result of which the costs and the energy expenditure are lowered and at the same time environmentally acceptability is increased.

Advantageously, the various electrodes in the anode chamber and the cathode chamber have differing structures. As a result, it is possible for the individual chambers to have differing volumes, in such a manner that, at identical, or at least virtually identical, pressure in the two chambers, different volumes of liquid can be passed through the respective chambers.

Advantageously, the electrolyte forms ammonium ions and is advantageously ammonium hydroxide. It has proved to be advantageous when the water that is passed through the anode chamber and/or through the cathode chamber passes through the respective chamber many times, in particular two times. In this manner, the respective water can be concentrated, in such a manner that a more highly concentrated electrolyzed water or a more highly concentrated ozonized water can be achieved without the flow volume through the respective other chambers being increased. As a result, it is, in particular, possible, in the case of a three-chamber variant of the electrode arrangement, to be able to set, virtually completely independently of one another, the produced concentrations of ozonized water in the anode chamber and electrolyzed water in the cathode chamber, without the volume of wastewater that is to be disposed of drastically increasing. Obviously, this advantage may also be achieved using a plurality of successively arranged anode chambers or cathode chambers, respectively.

The invention achieves the object in question in addition by an electrode arrangement for carrying out a method according to one exemplary embodiment of the present invention that is characterized in that the anode and/or the cathode has a structure in the electrode surface which mixes the water flowing through the respective chamber, in particular puts it into a turbulent flow. In the case of such an electrode arrangement, it has proved to be advantageous when the anode and the cathode have different structures. In this manner it is possible to adapt the electrode surfaces to the respective demands and requirements which depend, for example, on flow volume, desired concentration and ions used.

It has proved to be advantageous when the anode and the cathode are diamond electrodes. Diamond electrodes are known in principle from the prior art and have a fine crystalline diamond layer on the surface of a three-dimensional base body. In conventional catalytically active electrode materials, in which the electrochemical reactions proceed under potential control and which are present, for example, in metal, graphite or mixed oxide electrodes, the development of the electric field at the electrode surface relative to the counter electrode is influenced by the structuring. The strength of the electric field varies consequently along the surface of the respective electrode, in such a manner that a spatially inhomogeneous formation of electrolyte ions occurs. Even when said materials are suitable for a device described here and for carrying out the method described here, diamond electrodes are to be preferred to these materials. Diamond electrodes are electrodes having a base body made of a substrate, for example silicon, onto which a polycrystalline diamond layer is applied. These non-catalytically active electrodes can be operated under current control, in such a manner that, despite the structuring, a homogeneous distribution of the electric field occurs at the surface of the electrode. In this manner, therefore, the advantages of the present invention are implemented, without the disadvantages due to a markedly inhomogeneous field distribution and an accompanying inhomogeneous ion generation occurring.

In addition, in the case of the embodiment described here, the membranes abut the electrodes over a higher surface area than is the case, for example, with the mesh electrodes of the prior art. Therefore, firstly, the contact between the electrode and membrane is improved, and secondly the thermal and/or mechanical loading of the membrane to which they are exposed is reduced.

BRIFF DESCRIPTION OF THE DRAWINGS

An exemplary embodiment of the present invention will be explained in more detail with the aid of the accompanying drawings hereinafter. In the drawings FIGS. 1a to 1d—show an electrode for an electrode arrangement according to a first exemplary embodiment of the present invention in different views, FIGS. 2a and 2b—show two sectional views through an electrode arrangement according to a further exemplary embodiment of the present invention.

DETAILED DESCRIPTION

Figures 1A, 1B:
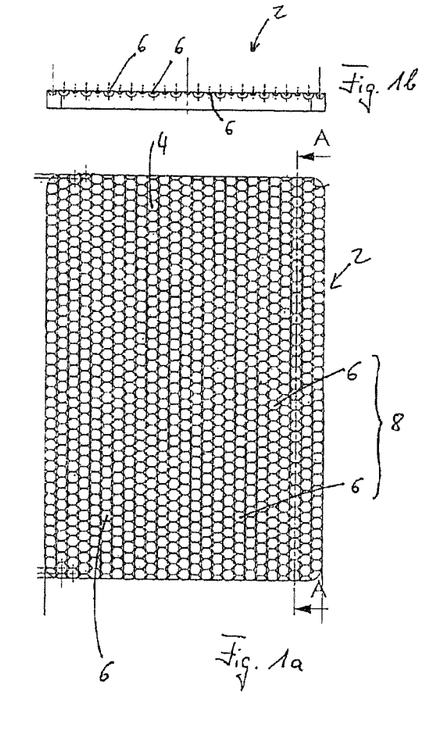

FIG. 1a shows an electrode 2 with a view of an electrode surface 4. The electrode surface 4 has a multiplicity of recesses 6 which, in the exemplary embodiment shown, are constructed in a sphere surface segment shape. The recesses 6 together form a structure 8 of the electrode surface 4. It can be seen that the individual recesses 6 overlap one another and so the boundary lines of the recesses 6 shown in FIG. 1a are not exactly circular.

FIG. 1b shows the electrode 2 in a side view. The individual recesses 6 can be seen that are arranged adjacently and are shown at different depths in the side view. Between the individual recesses 6 there are regions in which the electrode surface 4 has no recesses 6. The electrode 2 is advantageously a diamond electrode which has the advantages that are already indicated.

Figure 1C:
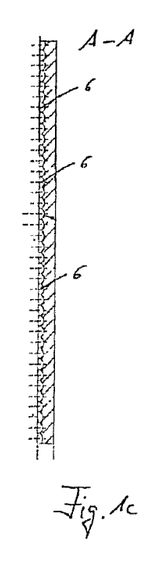

FIG. 1c is a sectional image along the line A-A of FIG. 1a. It can be seen here that the individual recesses 6 overlap one another and so the structures formed between two adjacent recesses 6 do not reach the full height of the electrode surface 4 as is present, for example, between two adjacent lines of recesses 6.

Figure 1D:
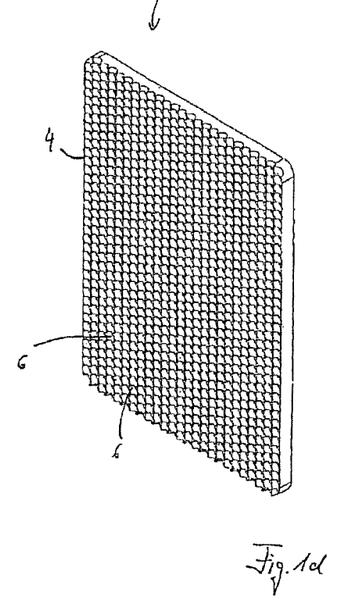

FIG. 1d shows a schematic 3D view of the electrode 2 having a multiplicity of recesses 6. Clearly, the recesses 6 can also have different geometric forms and need not be arranged regularly.

Figure 2A:
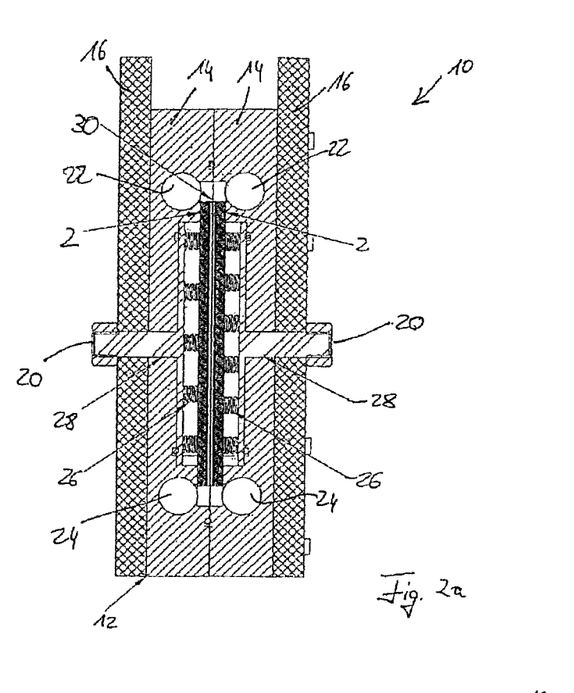
Figure 2B:
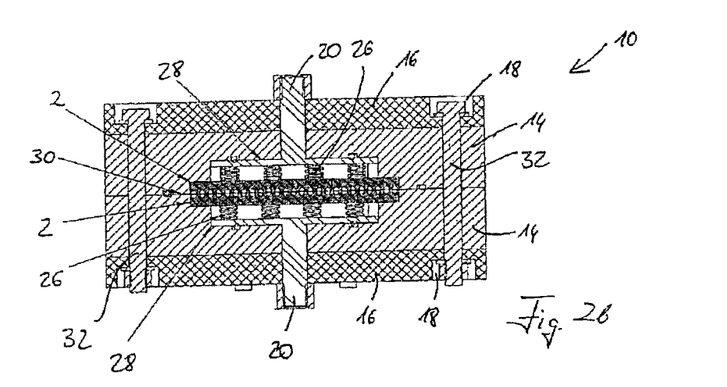

FIGS. 2a and 2b show sectional images through an electrode arrangement 10 that is arranged in a housing 12. The housing 12 comprises, in the exemplary embodiment indicated, two chamber housings 14 that are covered at the side by two cover plates 16. FIG. 2a shows a longitudinal section through the electrode arrangement 10. The two chamber housings 14 can be seen which each have a feed 22 and an outlet 24. The cover plates 16 arranged at the side each have an electrical connection 20 via which the electrical voltage can be transmitted to the electrodes 2. The two electrodes 2 are electrically connected via contact springs 26 and contact plates 28 to the electrical connections 20. The electrodes 2 can be supplied with electric current and an electric voltage in this manner. Between the two electrodes 2 there is a membrane 30, which separates the two chambers, namely the anode chamber and the cathode chamber, from one another.

The electrode arrangement 10 shown in FIG. 2a has only one anode chamber and one cathode chamber. The liquid that is to be processed enters through the respective feed 22 into the respective chamber and here comes into contact with the electrode 2 belonging to the respective chamber, or at least with the electric field built up via the electrodes 2. As a result, the electrochemical treatment is performed. Then, the respective liquid exits again through the respective outlet 24. The two chambers not explicitly shown in FIG. 2a are therefore restricted on the respective outer side by the respective electrode 2 and on the opposite inner side by the membrane 30, which, in particular, can advantageously be an ion-selective membrane.

FIG. 2b shows a cross sectional image through the electrode arrangement 10 with the chamber housings 14 thereof and the cover plates 16. Here also, electrodes 2, contact springs 26, contact plates 28 and electrical connections 20 are shown. The membrane 30 runs between the two electrodes 2, which membrane separates the two chambers which are also present in FIG. 2b from one another.

In FIG. 2b, in addition, the boreholes 18 are shown in the cover plates 16, through which boreholes screws 32 are conducted, in order to ensure a secure hold of the cover plates 16 and the chamber housings 14 to one another. In FIG. 2b, the structure 8 can be seen at the respective inner side of the electrode 2, which forms the electrode surface 4.

Figure 3:
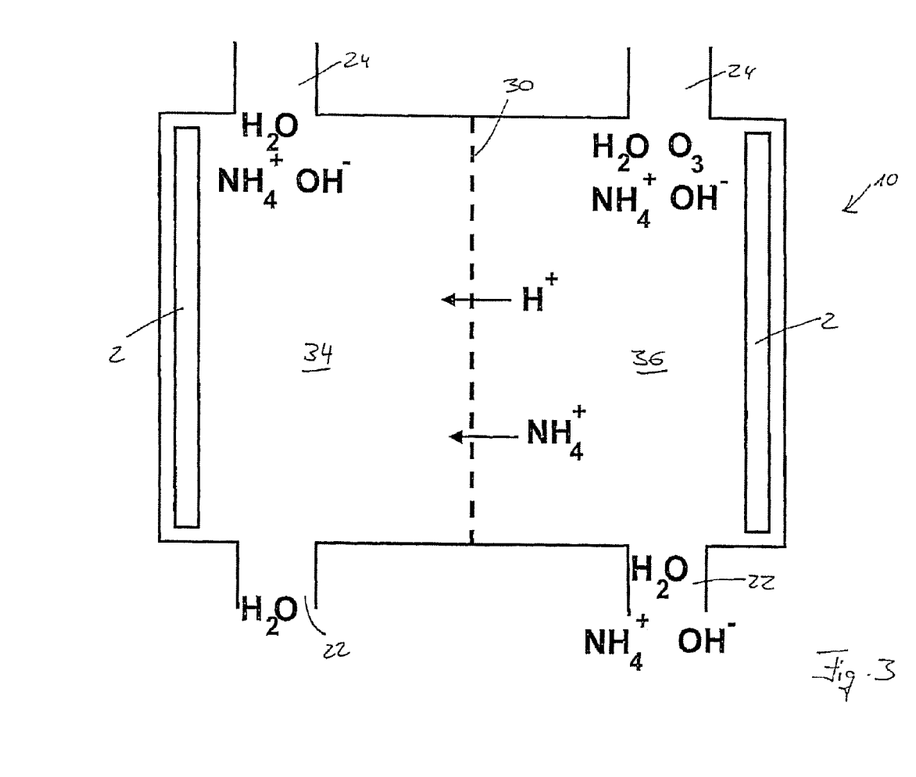
FIG. 3—shows a schematic image of an electrode arrangement for a method according to a further exemplary embodiment of the present invention.

FIG. 3 shows schematically a section through an electrode arrangement 10. The electrode arrangement 10 has two chambers of which the left-hand one is a cathode chamber 34 and the right-hand one is an anode chamber 36. The cathode chamber 34 is fed via the feed thereof 22 with deionized and/or demineralized water. Via the feed 22 of the anode chamber 36, water is fed in which there is situated an electrolyte which in this case forms ammonium ions. Between the cathode chamber 34 and the anode chamber 36 is situated the membrane 30 which is constructed to be ion-sensitive.

In the cathode chamber water, with addition of electrons that are supplied by the cathode 2, is cleaved into $H_2$ molecules and $OH^-$ ions. The following applies here: $6H_2O+6e^-\rightarrow 3H_2+6OH^-$.

In the anode chamber 36, in contrast, water is cleaved into ozone and $H^+$ ions with release of electrons, which are accepted by the anode 2. Here the following applies: $3H_2O\rightarrow 6H^++O_3+6e^-$.

The ion-selective membrane 30 is constructed in this case in such a manner that only positive ions can pass through the membrane 30. These are in the present case the hydrogen ions $H^+$ and also the ammonium ions $NH_4^+$. In this manner the compositions are formed that are shown at the outlets 24 of the cathode chamber 34 and of the anode chamber 36 and leave the respective chamber via these outlets 24.

LIST OF REFERENCE SIGNS

2 Electrode, anode, cathode
4 Electrode surface
6 Recess
8 Structure
10 Electrode arrangement
12 Housing
14 Chamber housing
16 Cover plate
18 Borehole
20 Electrical connection
22 Feed
24 Outlet
26 Contact spring
28 Contact plate
30 Membrane
32 Screw
34 Cathode chamber
36 Anode chamber

The invention claimed is:

1. A method for the electrochemical production of electrolyzed water in an electrode arrangement that has an anode chamber and a cathode chamber which are separated from one another by at least one ion-selective membrane, wherein the anode chamber is bordered on at least one side by at least one anode that is an unperforated diamond electrode and the cathode chamber is bordered on at least one side by at least one cathode that is an unperforated diamond electrode, the anode and/or cathode chamber being delimited by the anode or cathode respectively, wherein the at least one anode and the at least one cathode has a structure on an electrode surface comprising a multiplicity of recesses, grooves, or rills, the method comprising:
 a) passing water in which an electrolyte is situated through the anode chamber,
 b) passing the water through the cathode chamber,
 c) mixing the water in the anode chamber and/or cathode chamber,
 d) applying an electrical voltage to the anode and the cathode in such a manner that electrolyzed water is formed from the water in the cathode chamber.

2. The method as claimed in claim 1, wherein the anode and/or the cathode have an electrode surface that has a structure, wherein a distance between the electrode surface and an opposite side of a respective anode and/or cathode chamber repeatedly increases and decreases along at least one direction, wherein the structure forms at least 30% of the electrode surface, wherein the water in the anode chamber and/or the cathode chamber is mixed by the structure of the electrode surface.

3. The method as claimed in claim 1, wherein differing volumes of water are passed through the anode and the cathode chambers, and wherein the differing volumes is equal to or more than twice as much water being passed through either the anode chamber relative to the cathode chamber, or the cathode chamber relative to the anode chamber.

4. The method as claimed claim 1, further comprising the step of forming ammonium ions with the electrolyte.

5. The method as claimed in claim 1, wherein at least one of the steps of passing the water through the anode chamber or passing the water through the cathode chamber is performed a plurality of times.

6. The method of claim 1, wherein the mixing step produces a turbulent flow.

7. The method of claim 1, wherein the electrolyte is ammonium hydroxide.

8. A method for the electrochemical production of electrolyzed water and ozonized water in an electrode arrangement that has an anode chamber, a cathode chamber and a middle chamber arranged between the anode chamber and the cathode chamber, which are each separated from one another by an ion-selective membrane, wherein the anode chamber is bounded on at least one side by at least one anode that is an unperforated diamond electrode and the cathode chamber is bounded on at least one side by at least one cathode that is an unperforated diamond electrode, the anode and/or cathode chamber being delimited by the anode or cathode respectively, wherein the at least one anode and the at least one cathode has a structure on an electrode surface comprising a multiplicity of recesses, grooves, or rills, the method comprising :
 a) passing water through the anode chamber and through the cathode chamber,
 b) passing the water through the middle chamber,
 c) mixing the water in the anode chamber and/or cathode chamber,
 d) applying an electrical voltage to the at least one anode and the at least one cathode in such a manner that electrolyzed water is formed from the water in the cathode chamber and ozonized water is formed from the water in the anode chamber.

9. The method as claimed in claim 8, wherein the anode and/or the cathode have an electrode surface that has a structure, wherein a distance between the electrode surface and an opposite side of a respective anode and/or cathode chamber repeatedly increases and decreases along at least one direction, wherein the structure forms at least 30% of the electrode surface, wherein the water in the anode chamber and/or the cathode chamber is mixed by the structure of the electrode surface.

10. The method as claimed in claim 8, wherein differing volumes of water are passed through the anode and the cathode chambers.

11. The method as claimed in claim 10, wherein the differing volumes is equal to or more than twice as much water being passed through either the anode chamber relative to the cathode chamber, or the cathode chamber relative to the anode chamber.

12. The method as claimed in claim 8, wherein at least one of the steps of passing the water through the anode chamber or passing the water through the cathode chamber is performed a plurality of times.

13. The method as claimed in claim 8, wherein the mixing step produces a turbulent flow.

14. An electrode arrangement for electrochemical production of electrolyzed water, comprising:
   an anode chamber bordered on at least one side by at least one anode, wherein said at least one anode is an unperforated diamond electrode;
   a cathode chamber bordered on at least one side by at least one cathode, wherein said at least one cathode is an unperforated diamond electrode;
   wherein the at least one anode and the at least one cathode has a structure on an electrode surface comprising a multiplicity of recesses, grooves, or rills, wherein a distance between the electrode surface and an opposite side of the respective anode and/or cathode chamber repeatedly increases and decreases along at least a flow-through direction, wherein water flowing through the respective anode and/or cathode chamber is mixed in the anode and/or cathode chamber by the structure, wherein the anode and/or cathode chamber is delimited by the anode or cathode respectively.

15. The electrode arrangement as claimed in claim 14,
   wherein the at least one anode has a structure on an electrode surface comprising a multiplicity of recesses, grooves, or rills and the at least one cathode has a structure on an electrode surface comprising a multiplicity of recesses, grooves, or rills,
   wherein the structure of the anode is different from the structure of the cathode,
   wherein a distance between the electrode surface of the at least one anode and an opposite side of the anode chamber repeatedly increases and decreases along the flow-through direction, and
   wherein a distance between the electrode surface of the at least one cathode and an opposite side of the cathode chamber repeatedly increases and decreases along the flow-through direction.

16. The electrode arrangement of claim 14, wherein the structure is configured to cause the water flowing through the anode and/or cathode chamber to flow in a turbulent manner.

17. The electrode arrangement of claim 14, wherein the multiplicity of recesses, grooves, or rills form channels that are one or more of: arranged parallel to one another, crossing one another at an angle, in a wave shape, or curved.

18. The electrode arrangement of claim 14, wherein the multiplicity of recesses, grooves, or rills form channels that have varying width and/or depth along the course of the channels.

19. The electrode arrangement of claim 14, wherein the multiplicity of recesses, grooves, or rills form a plurality of channels that overlap one another.

* * * * *